(12) United States Patent
Lessard et al.

(10) Patent No.: US 11,708,096 B2
(45) Date of Patent: Jul. 25, 2023

(54) SIDE WALL FOR A RAIL VEHICLE

(71) Applicant: Bombardier Transportation GmbH, Berlin (DE)

(72) Inventors: Nancy Lessard, Sainte-Anne de la Pocatiere (CA); Danny Higgins, St-Basile-le Grand (CA); Stephane Goulet, Laval (CA); Gaston Morneau, La Pocatiere (CA); Yvan Gosselin, La Pocatiere (CA); Martin Bigras, Longueuil (CA)

(73) Assignee: Bombardier Transportation GmbH, Berlin (DE)

( * ) Notice: Subject to any disclaimer, the term of this patent is extended or adjusted under 35 U.S.C. 154(b) by 435 days.

(21) Appl. No.: 16/892,436

(22) Filed: Jun. 4, 2020

(65) Prior Publication Data
US 2021/0061318 A1 Mar. 4, 2021

(30) Foreign Application Priority Data

Aug. 28, 2019 (CA) .................................. CA 3053303

(51) Int. Cl.
*B61D 17/08* (2006.01)
*B61D 17/18* (2006.01)
(Continued)

(52) U.S. Cl.
CPC .............. *B61D 17/08* (2013.01); *B61C 17/04* (2013.01); *B61D 17/06* (2013.01); *B61D 17/18* (2013.01);
(Continued)

(58) Field of Classification Search
CPC ........ B61D 17/00; B61D 17/04; B61D 17/06; B61D 17/08; B61D 17/12; B61D 17/18;
(Continued)

(56) References Cited

U.S. PATENT DOCUMENTS

| 5,749,302 A | 5/1998 | Tegeler | |
| 7,958,831 B2 * | 6/2011 | Campus | ............... B61D 17/045 |
| | | | 105/396 |

(Continued)

FOREIGN PATENT DOCUMENTS

| DE | 2707573 A1 | 8/1978 |
| DE | 9306853 U1 | 7/1993 |

(Continued)

*Primary Examiner* — S. Joseph Morano
*Assistant Examiner* — Cheng Lin
(74) *Attorney, Agent, or Firm* — The Webb Law Firm

(57) ABSTRACT

A side wall for a rail vehicle body includes an outer skin, an insulating layer adjacent an inner face of the outer skin, a structural layer adjacent an inner face of the insulating layer, a finishing layer adjacent an inner face of the structural layer and a window. The insulating layer provides at least one of a thermal and an acoustical insulation. The structural layer has a longitudinally aligned top door frame member, vertical left and right door frame members and a plurality of diagonal structural members oriented at an angle comprised between 1 degree and 89 degrees from the top door frame member. The plurality of diagonal structural members defines a lattice structure having a plurality of openings there in between. The window covers at least a portion of one of the plurality of openings.

18 Claims, 3 Drawing Sheets

(51) Int. Cl.
*B61D 17/06* (2006.01)
*B61C 17/04* (2006.01)
*B61D 19/00* (2006.01)
*B61D 25/00* (2006.01)

(52) U.S. Cl.
CPC .......... *B61D 17/185* (2013.01); *B61D 19/001* (2013.01); *B61D 25/00* (2013.01)

(58) Field of Classification Search
CPC .... B61D 17/185; B61D 19/00; B61D 19/001; B61D 25/00; B61D 49/00; B61D 27/00
See application file for complete search history.

(56) References Cited

U.S. PATENT DOCUMENTS

| | | | |
|---|---|---|---|
| 2005/0044712 A1 * | 3/2005 | Gideon | B64D 13/06 |
| | | | 29/527.3 |
| 2008/0011188 A1 | 1/2008 | Campus | |
| 2009/0126600 A1 * | 5/2009 | Zupancich | B61D 17/10 |
| | | | 220/592.2 |

FOREIGN PATENT DOCUMENTS

| | | | | |
|---|---|---|---|---|
| DE | 9415771 | U1 | 12/1994 | |
| EP | 838384 | A1 * | 4/1998 | ............ B61D 17/04 |
| EP | 1862366 | A2 | 12/2007 | |
| EP | 2033869 | A1 * | 3/2009 | ............ B61D 17/18 |
| RU | 2286271 | C1 * | 10/2006 | ............ B60H 3/00 |
| WO | 9711873 | A2 | 4/1997 | |

* cited by examiner

SIDE WALL FOR A RAIL VEHICLE

CROSS-REFERENCE TO RELATED APPLICATION

This application claims priority to Canadian Patent Application No. 3053303 filed Aug. 28, 2019, the disclosure of which is hereby incorporated by reference in its entirety.

BACKGROUND OF THE INVENTION

Field of the Invention

The present invention generally relates to the field of rail vehicles. More specifically, the invention relates to a construction of a side wall for a body of a rail vehicle.

Brief Description of Prior Art

The structure of the body of rail vehicles may be manufactured in different ways. Two ways are more often used: in a first type of construction, parallel side posts in the side walls, interconnected by carlines in the roof, are attached to a frame receiving a floor while an external skin and interior panels close the structure. In a second type of construction, extrusions are longitudinally welded side by side and define the floor, walls and roof of the railcar body. Some other types of construction also exist, although more rarely used: in a third type of construction, sandwich panels are assembled together and define the walls and roof of the body. In this later case, the floor is often placed on an undercar frame, although sandwich panel could also be used for the floor and supporting structure.

European Patent no. 1862366 to Alstom discloses yet another type of railcar body construction, in particular a side wall structure using a layered construction. However, by its nature, the disclosed construction may not provide adequate thermal insulation because of the presence of thermal bridges, resulting in increased energy consumption to provide a comfortable ride to passengers. Also, one of the intermediate layers incorporates a structure to route electrical wires, but provides poor access, which may be detrimental when maintenance is required. Moreover, the side wall structure incorporates some canons of railcar window design resulting in a heavier and more expensive structure than could potentially be.

There is therefore a need for an improved railcar body structure, and more precisely, for a side wall construction of a railcar body.

SUMMARY OF THE INVENTION

It is an object of the present invention to provide a side wall for a rail vehicle body that overcomes or mitigates one or more disadvantages of known side wall constructions, or at least provides a useful alternative.

The invention provides the advantages of providing improved alignment of its structure with load paths, of allowing a better thermal insulation between interior and exterior and of providing an improved access to electrical wires running within the wall. In accordance with an embodiment of the present invention, there is provided a side wall for a rail vehicle body. The side wall comprises an outer skin, an insulating layer adjacent an inner face of the outer skin, a structural layer adjacent an inner face of the insulating layer, a finishing layer adjacent an inner face of the structural layer and a window. The insulating layer is operative to provide at least one of a thermal and an acoustical insulation. The structural layer has a longitudinally aligned top door frame member and vertically aligned left and right door frame members each depending from a different end of the top door frame member. Together, they define a door opening. The structural layer also comprises a longitudinal top structural member proximate the top door frame member as well as a plurality of diagonal structural members oriented at an angle comprised between 1 degree and 89 degrees from the top door frame member. The plurality of diagonal structural members defines a lattice structure having a plurality of openings there in between. At least one of the plurality of diagonal structural members is connected to the longitudinal top structural member and defines a wiring channel for routing electrical wiring. The wiring channel extends downwardly and diagonally from the top structural member to an intermediate position between the top structural member and a bottom portion of the structural layer. The wiring channel has an opening on an inner face of the structural layer which extends at least partially along the wiring channel. The window covers at least a portion of one of the plurality of diagonal structural members. The finishing layer completely overlaps the wiring channel so as to close the opening of the wiring channel. The finishing layer is removably attached to the structural layer so as to provide access to at least a portion of the wiring channel.

Optionally, the structural layer may further comprise a longitudinal bottom structural member. The diagonal structural members then extend from the top structural member to the bottom structural member.

A first one of the plurality of diagonal structural members may be oriented at substantially 45 degrees from the top door frame member while a second one of the plurality of diagonal structural members may be oriented substantially perpendicularly to the first one of the plurality of structural members. Both the first one and the second one of the plurality of diagonal structural members are then located intermediate the left door frame member and a vertical left corner member located at a left extremity of the structural layer.

Optionally, the structural layer may comprise webs between at least two of the plurality of diagonal structural members. The structural layer may also be provided with mounting points for mounting equipment such as seats for example. In the case of seats, they may be mounted to the structural layer through the finishing layer.

Preferably, the structural layer further comprises a ventilation channel for routing air to the window. The ventilation channel may, at least partially, be open on an inner face of the structural layer. In this case, the finishing layer completely overlaps the ventilation channel so as to close the ventilation channel. The ventilation channel may also coincide with one of the plurality of diagonal structural members. In this case, the ventilation channel is equipped with a vent for delivering air to the window.

Optionally, the opening may extend completely along the wiring channel. The wiring channel itself may also extend within the longitudinal top structural member.

At least one other of the plurality of diagonal structural members may be connected to one of the top door frame member, the left door frame member and the right door frame member.

The structural layer may typically be made using one or more of the following methods: folded sheet metal, molded thermoset composite material containing fibers and resin, and an additively manufactured material.

Typically, the window overlaps at least one of the diagonal structural members. The window may even stretch from the left door frame member up to a vertical left corner member located at a left extremity of the structural layer. The window also cover at least a portion of the plurality of openings.

The insulating layer may be bonded to the structural layer while the outer skin may be bonded to the insulating layer.

In accordance with another embodiment of the present invention, there is provided a rail vehicle for passengers. The rail vehicle comprises a body and two bogies supporting the body and located at a different end of said body. The body comprises an underframe, a passenger floor on the underframe, at least two side walls as described above, two end walls and a roof. Each side wall is located on a different longitudinal side of the underframe. Each end wall is located at a different end of the underframe. The roof is connected to an upper portion of the two side walls and of the two end walls.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a side wall for a rail vehicle body having a layered structure optimized for loads and which provides improved thermal insulation as well as improved access to wiring routed inside the side wall.

Figure 1:
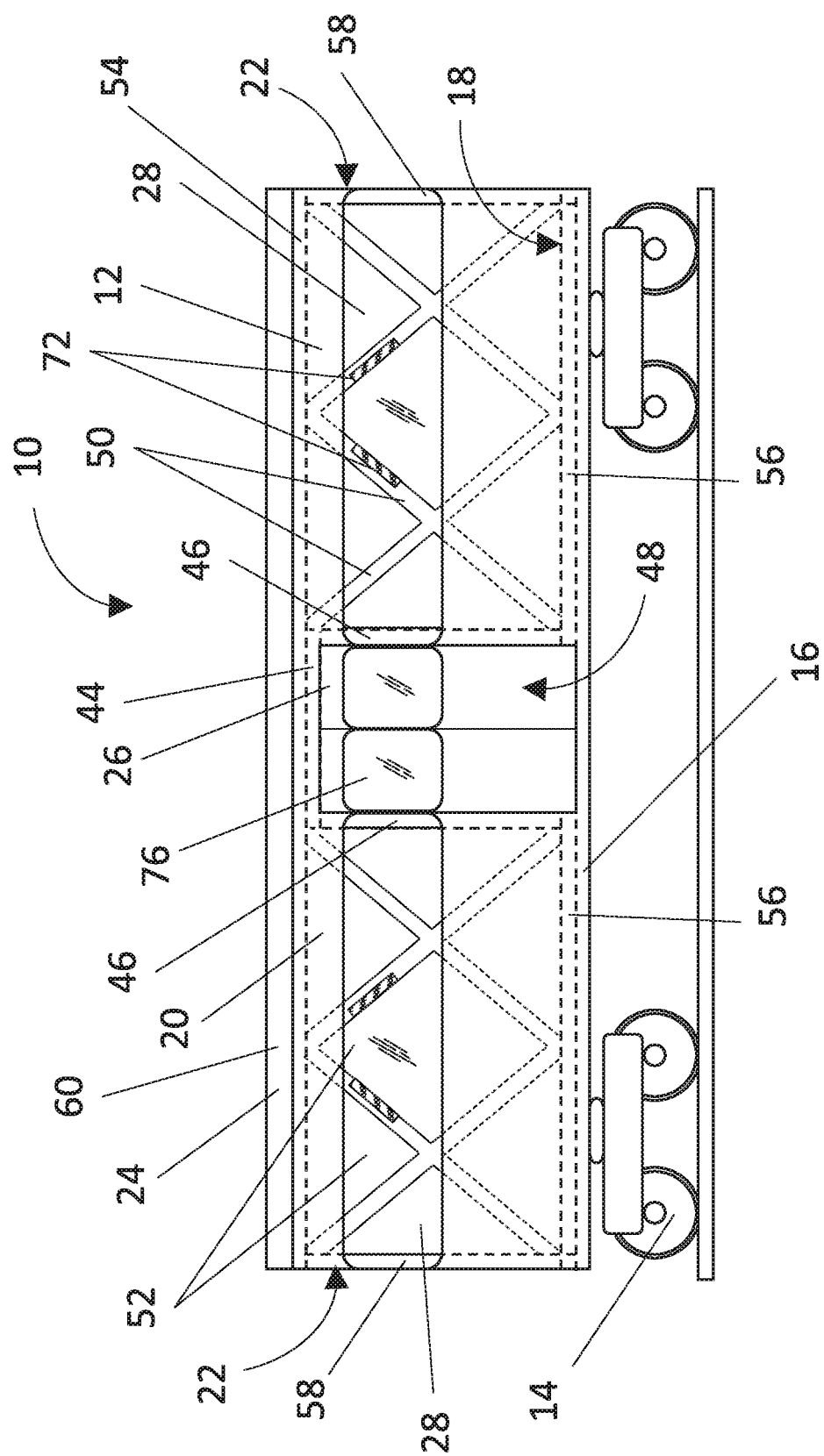
FIG. 1 is a side view of a rail vehicle in accordance with an embodiment of the present invention.

FIG. 1, now referred to, shows a rail vehicle for passengers 10, complete with its railcar body 12 and its two bogies 14 supporting the body 12 at each end of the body 12. The body 12 comprises an underframe 16, a passenger floor 18 laid over the underframe 16, two side walls 20, two end walls 22 and a roof 24. Each side wall is attached to the underframe 16, on a different longitudinal side of the underframe 16. Each end wall 22 is located at a different end of the underframe 16. The roof 24 is connected to an upper portion of the two side walls 20 and of the two end walls 22. Because this is a passenger rail vehicle 10, the body 12 also comprises at least one door 26 and at least one window 28.

Figure 2:
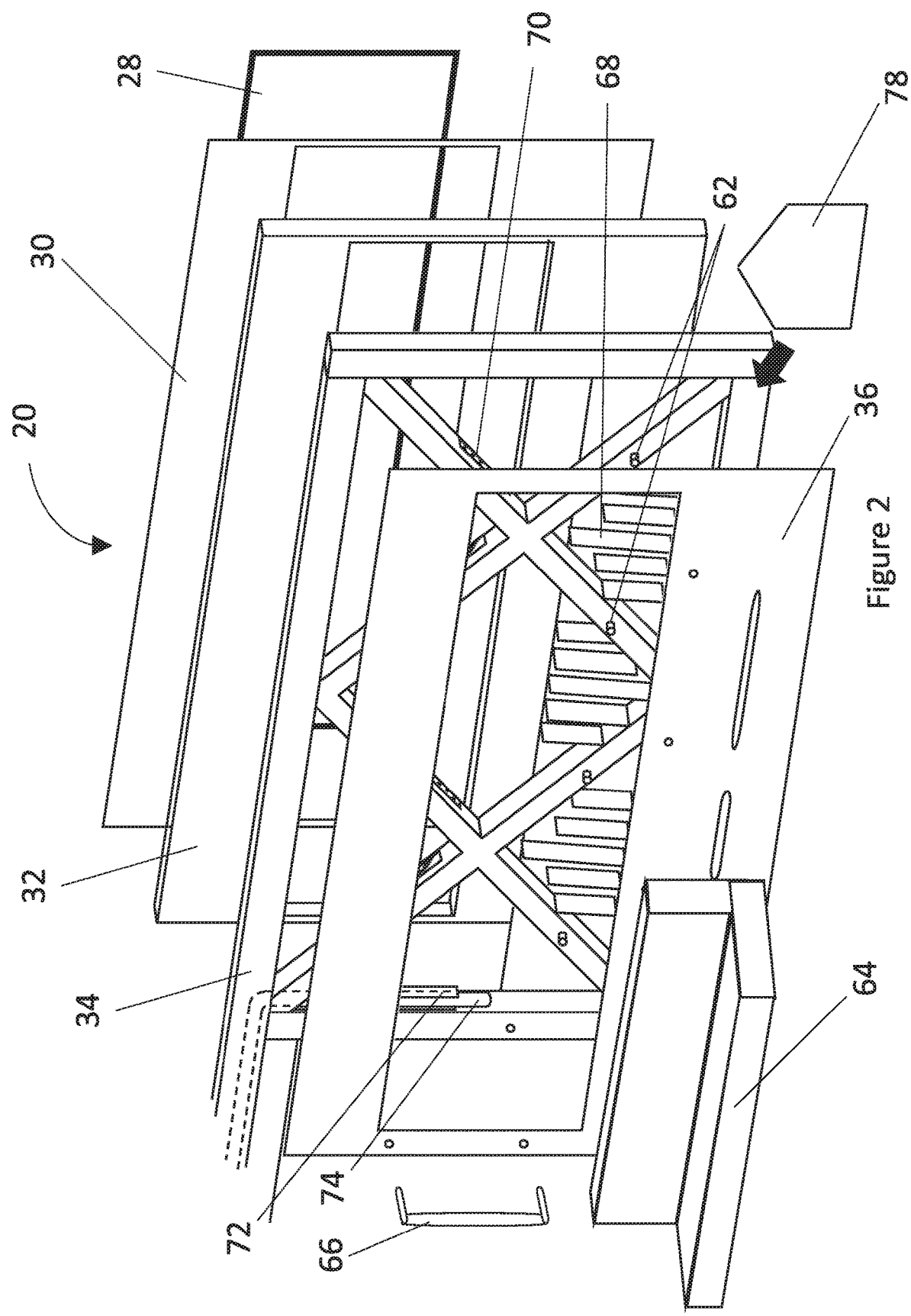
FIG. 2 is an exploded isometric view from an exterior towards an interior of a portion of a side wall of the rail vehicle of FIG. 1.

FIG. 2 is now concurrently referred to. Because both side walls 20 have a similar structure, only one will be described. FIG. 2 depicts a portion of one side wall 20 comprised between the door 26 and one extremity of the body 12. Another portion located between the other side of the door 26 and the other extremity of the body 12 is similar. The side wall 20 comprises, sequentially from an exterior to an interior, an outer skin 30, an insulating layer 32 adjacent an inner face of the outer skin 30, a structural layer 34 adjacent an inner face of the insulating layer 32 and a finishing layer 36 adjacent an inner face of the structural layer 34. A window 28 is also provided adjacent an exterior face of the structural layer 34.

Figure 3:
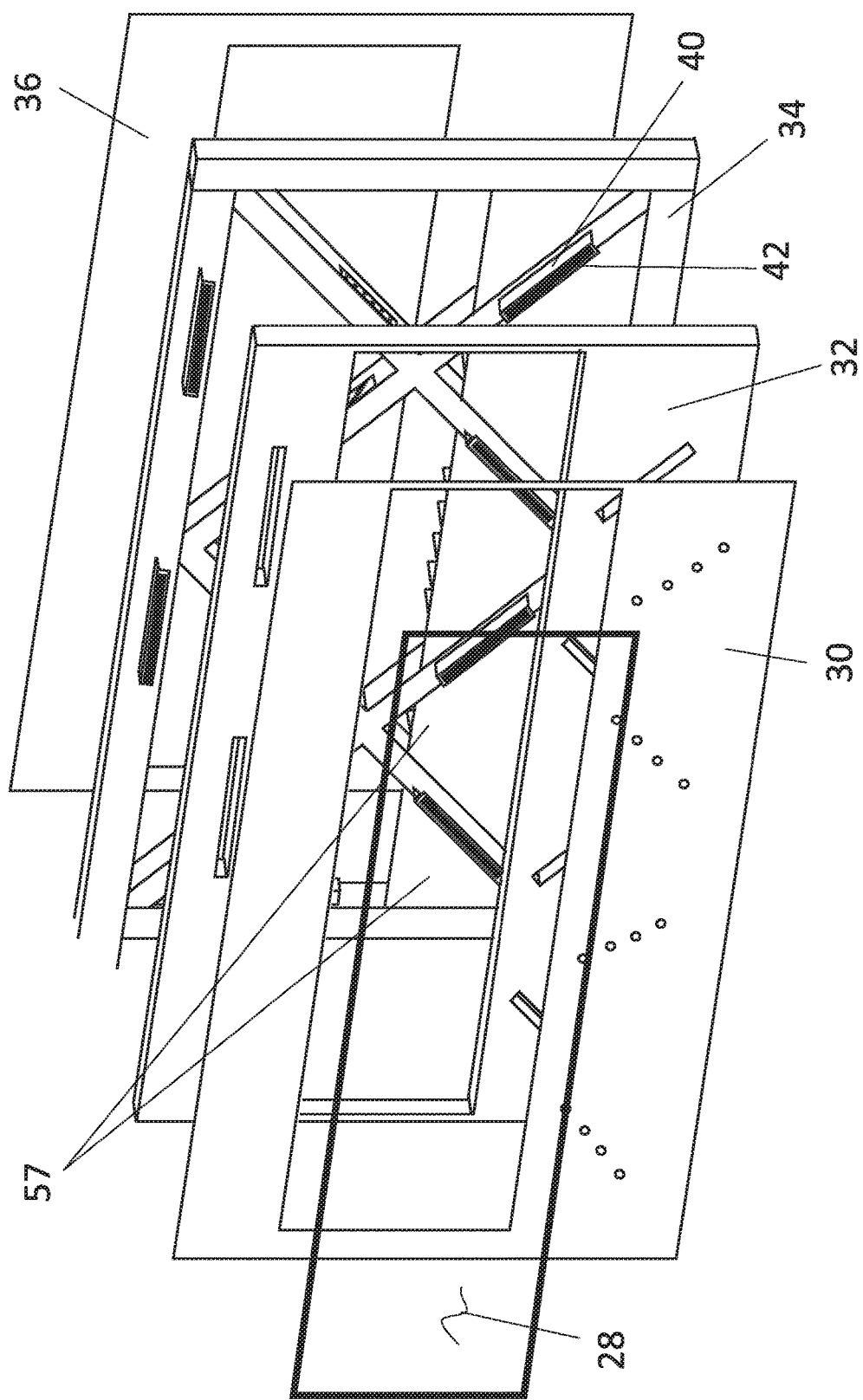
FIG. 3 is an exploded isometric view from the interior towards the exterior of a portion of a side wall of the rail vehicle of FIG. 1.

FIG. 3 is now concurrently referred to. The outer skin 30 is mostly used as a shell, protecting the other layers from exposure to environmental elements, such as rain for example. The outer skin 30 is typically made of a sheet of metallic material, such as steel, stainless steel or aluminum. It may also be made from thermoplastics or from thermosets composite material, of the type using a fibrous material embedded in a resin such as carbon fiber in epoxy or glass fiber in polyester for example. The outer skin 30 may be bonded to the insulating layer 32, or it may be physically attached (screwed, welded or riveted) to brackets 40 of the structural layer 34 protruding through the insulating layer 32. When the outer skin 30 is bonded with the insulating layer 32, it is possible that some or all brackets 40 may not be required. To insure adequate thermal insulation, a small strip of an insulating material, such as a rubber strip 42, may be used between the bracket 40 and the outer skin 30.

The insulating layer 32 is used to insulate either thermically or acoustically, or both, the interior of the body 12 from the exterior. The insulating layer 32 may be made of rock wool, foam, or a combination of known insulating materials. The insulating layer 32 may be bonded to the structural layer 34 or may simply be held in place with screws or through the brackets 40.

As best shown in FIG. 1, the structural layer 34 has a longitudinally aligned top door frame member 44 and vertically aligned left and right door frame members 46 each depending from a different end of the top door frame member 44. Together, they define a door opening 48. The left and right door frame members 46 may each have a cavity for pocket doors to slide inside the side wall 20. Alternatively, the left and right door frame members 46 may be not have such cavity if plug doors are used.

The structural layer 34 also comprises a plurality of diagonal structural members 50 oriented at any angle comprised between 1 degree and 89 degrees from the top door frame member 44. At least one of these diagonal structural members 50 is connected to either the top door frame member 44 or either one of the left and the right door frame members 46.

The diagonal structural members 50 defines a lattice structure showing a plurality of openings 52 there in between. These diagonal structural members 50 are typically oriented along load paths as defined by optimizing the topology of the structural layer using a topology optimization software. This topology optimization must be realized by taking into account the door openings 48, but without considering typical rectangular window openings. Typically, the results of such topological optimization will yield at least one diagonal structural member 50 oriented at substantially 45 degrees from horizontal (or from an horizontal reference such as the top door frame member 44) and a second diagonal structural member 50 substantially perpendicular to the first diagonal structural member 50, both located at an intermediate position between one of the door frame members 46 (for example the left one) and a vertical corner member 58 located at an extremity of the corresponding side (left, in the present example) of the structural layer 34. The diagonal structural members 50 typically also intersect at a vertical intermediate position between the underframe 16 and the roof 24 and therefrom divert at a different angle.

As part of the structural layer 34, a longitudinal top structural member 54 and a longitudinal bottom structural member 56 may also be used not only to provide added rigidity, but also to provide easy assembly with both the roof 24 and the underframe 16. Indeed, using such a modular construction, the different components of the body 12 may be separately manufactured and assembled together at a later assembly step. This is also convenient when final assembly is performed at a remote final assembly site. When the longitudinal top structural member 54 and the longitudinal bottom structural member 56 are used, the diagonal structural members 50 may extend all the way from one to the other. Otherwise, the diagonal structural members 50 may extend from the underframe 16 to the roof 24, and more precisely to a cant rail 60, which may either double as the longitudinal top structural member 54 or be part of the roof 24, and which run the length of the roof on each side to connect with the side walls 20.

The diagonal structural members 50 may either have a closed or an open cross-section. The diagonal structural members 50 may be formed in many different ways: they can be formed by tubes or extrusions (either steel, aluminum or composite materials, for example, carbon-fiber tubes embedded in resin) using nodes at intersections. The tubes may be welded or bonded at these nodes. The nodes may be cast, machined or built using an additive manufacturing process such as 3D printing. Alternatively, the structural layer 34 may be made of a sheet of material (typically steel or aluminum), which may be laser cut and bent to create the diagonal structural members 50. Alternatively, the features of the structural layer 34, such as the diagonal structural members 50, may be created by embossing a sheet of metal, or by molding a composite material Optionally, the structural layer 34 may comprise reinforcing webs 57 attached between two intersecting diagonal structural members 50 or between one diagonal structural member 50 and one of the left and right door member 46 or the vertical corner member 58. The structural layer 34 may also be provided with mounting points 62 for mounting different kinds of equipment such as seats 64 or grab rails 66 for example. Such equipment is mounted to the structural layer 34 through the finishing layer 36 since the finishing layer 36 cannot provide the required rigidity to support heavy loads (for example, persons sitting on the seat 64 or persons pulling on the grab rail 66).

The structural layer 34 may further include ventilation channel 68 for routing air to the windows 28. Depending on the manufacturing method of the structural layer 34, the one or more ventilation channels 68 may either be created by cutting and folding sheet metal, by creating channels using additive manufacturing, or by using one or more of the diagonal structural members 50 as ventilation channels. In this later case, at least one of the diagonal structural members 50 is provided with vents 70 proximate the window 28 for delivering air and heat to the windows 28 and to the passengers. In this case, the vent 70 may be as simple as an opening to let air out of the ventilation channel 68. The ventilation channel 68 may, at least partially, have an open cross-section with its open face on the inner face of the structural layer 34. When this is the case, the finishing layer 36 completely overlaps the ventilation channel 68 so as to close the ventilation channel 68 and create a sealed ventilation channel 68.

The structural layer 34 may further be equipped with a wiring channel 72 for routing an electrical harness 74 comprising electrical wires. The wiring channel 72 typically extends longitudinally along the top portion or the bottom portion of the side walls 20 and branches out respectively either downwardly or upwardly to an intermediate position between the top structural member 54 and either the bottom portion of the structural layer 34 or the bottom structural member 56 when the structural layer 34 is so equipped. Conveniently, a longitudinal portion of the wiring channel 72 may coincide with the longitudinal top structural member 54. The downwardly extending portion of the wiring channel 72 may then use independent downwardly extending wiring channel portions, which may be adjacent to the diagonal structural members 50 and/or vertical structural members such as the left and right door frame members 46 or the vertical corner members 58. Alternatively, the downwardly extending portion of the wiring channel 72 may conveniently coincide with the diagonal structural members 50 and/or vertical structural members such as the left and right door frame members 46 or the vertical corner members 58, thereby doubling their function as structural member and wiring channel. Alternatively, it is possible to even triple the function of the diagonal structural members 50 and/or vertical structural members such as the left and right door frame members 46 or the vertical corner members 58 by using them as structural members, ventilation channels and wiring channels.

The wiring channel 72 may, at least partially or completely, be open on an inner face of the structural layer 34. The finishing layer 36 then completely overlaps the wiring channel 72 so as to close and optionally seal the wiring channel 72. Although the finishing layer 36 may be permanently fixed to the structural layer 34, for convenience of maintenance or repair, the finishing layer 36 may be removably attached to the structural layer 34. It then may be removed, thereby providing an easy access to the wiring harness 74 located in the completely open, or partially open, wiring channels 72.

As shown in FIG. 1, each window 28 (except for door windows 76) covers at least a portion of one of the plurality of openings 52 and may even overlap at least one of the diagonal structural members 50. As depicted, one window 28 may even extend from one of the vertical door frame members 46, such as the left door frame member 46, to the vertical corner member 58 at the corresponding extremity of the rail vehicle 10. The windows 28 are installed from the exterior of the rail vehicle 10, preferably flush with the exterior surface of the outer skin 30. The windows 28 are attached to the diagonal structural members 50 and, if required, to one of the left and right door frame members 46 and the vertical corner member 58. The windows 28 may be obscured, for example with a silk screen, locally to hide the structural members 50, 46, 58 they are attached to. In fact, the windows 28 may be obscured to hide any detail of the structural layer 34. As part of the windows attachment system, an insulating strip may be locally applied between the window 28 and the structural layer 34. Such insulating strip, made, for example, of rubber, may prevent rattling as well as provide thermal insulation.

The finishing layer 36 may comprise many finishing panels. Although this finishing layer 36 is mostly used for cosmetic reason, i.e. providing a pleasing appearance to the interior of the rail vehicle 10, in the present invention, the finishing layer 36 is also used to optionally close the ventilation channels 68 and/or the wiring channels 72. Of course, closing these channels is relevant only when such channels have an open cross-section. When open channels 68, 72 are used, a gasket 78 may be provided locally between the finishing layer 36 and the structural layer 34 to provide an adequate seal so that air, in the case of ventilation channels 68, or fumes, in the unfortunate case of a burning electrical wire within the wiring channel 72, do not escape to inappropriate areas of the vehicle, such as the passenger area. The diagonal structural members 50 may be left exposed to the interior of the rail vehicle 10, or the finishing layer 36 may stretch over them to provide a finished appearance to the diagonal structural members 50. Of course, in the case where the diagonal structural members 50 are provided with vents 70, the finishing layer 36 is also provided with corresponding openings, or vents of its own, for delivering air to the windows 28 and passengers.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A side wall for a rail vehicle body, the side wall comprising:
    an outer skin;
    an insulating layer having an outer face abutting an inner face of said outer skin, said insulating layer being operative to provide at least one of a thermal insulation and an acoustical insulation;
    a structural layer abutting an inner face of said insulating layer, said structural layer having:
    a longitudinally aligned top door frame member;
    vertically aligned left and right door frame members each depending from a different end of said top door frame member, thereby defining a door opening;
    a longitudinal top structural member proximate said top door frame member;
    a plurality of diagonal structural members oriented at an angle comprised between 1 degree and 89 degrees from said top door frame member, said plurality of diagonal structural members defining a lattice structure having a plurality of openings there in between, at least one of said plurality of diagonal structural members being connected to said longitudinal top structural member and defining a wiring channel for routing electrical wiring, said wiring channel extending downwardly and diagonally from said top structural member to an intermediate position between said top structural member and a bottom portion of said structural layer, said wiring channel having an opening on an inner face of said structural layer, said opening extending at least partially along said wiring channel; a window covering at least a portion of one of said plurality of diagonal structural members; and
    a finishing layer adjacent an inner face of said structural layer, said finishing layer completely overlapping said wiring channel so as to close said opening of said wiring channel, said finishing layer being removably attached to said structural layer so as to provide access to at least a portion of said wiring channel.

2. The side wall of claim 1, wherein said structural layer further comprises a longitudinal bottom structural member, said diagonal structural members extending from said top structural member to said bottom structural member.

3. The side wall of claim 1, wherein a first one of said plurality of diagonal structural members is oriented at 45 degrees from said top door frame member, and wherein a second one of said plurality of diagonal structural members is oriented perpendicularly to said first one of said plurality of structural members.

4. The side wall of claim 3, wherein said first one and said second one of said plurality of diagonal structural members are located intermediate said left door frame member and a vertical left corner member located at a left extremity of said structural layer.

5. The side wall of claim 1, wherein said structural layer comprises webs between at least two of said plurality of diagonal structural members.

6. The side wall of claim 1, wherein said structural layer further comprises a ventilation channel for routing air to said window.

7. The side wall of claim 6, wherein said ventilation channel is at least partially open on an inner face of said structural layer, said finishing layer completely overlapping said ventilation channel so as to close said ventilation channel.

8. The side wall of claim 6, wherein said ventilation channel coincides with one of said plurality of diagonal structural members equipped with a vent for delivering air to said window.

9. The side wall of claim 1, wherein said opening extends completely along said wiring channel.

10. The side wall of claim 1, where said wiring channel extends within said longitudinal top structural member.

11. The side wall of claim 1, wherein at least one other of said plurality of diagonal structural members is connected to one of said top door frame member, said left door frame member and said right door frame member.

12. The side wall of claim 1, wherein said structural layer is made of at least one of folded sheet metal, thermoset composite material containing fibers and resin, and an additively manufactured material.

13. The side wall of claim 1, wherein said window overlaps at least one of said diagonal structural members.

14. The side wall of claim 13, wherein said window stretches from said left door frame member to a vertical left corner member located at a left extremity of said structural layer.

15. The side wall of claim 1, wherein said structural layer comprises mounting points for a seat, said seat being attached to said mounting points through said finishing layer.

16. The side wall of claim 1, wherein said insulating layer is bonded to said structural layer.

17. The side wall of claim 1, wherein said outer skin is bonded to said insulating layer.

18. A rail vehicle for passengers, the rail vehicle comprising:
    a body, the body having:
    an underframe;
    a passenger floor on said underframe;
    two side walls as claimed in any one of claims 1 to 17, each side wall being located on a different longitudinal side of the underframe;
    two end walls, each end wall being located at a different end of said underframe;
    a roof connected to an upper portion of said two side walls and of said two end walls; and
    two bogies supporting the body and located at a different end of said body.

* * * * *